(12) United States Patent
Huang et al.

(10) Patent No.: US 11,149,935 B2
(45) Date of Patent: Oct. 19, 2021

(54) APPARATUS WITH LIGHTING DEVICES AND WIRING BOX CONNECTED BY WIRES

(71) Applicant: XIAMEN LEEDARSON LIGHTING CO., LTD, Fujian (CN)

(72) Inventors: Zhenkun Huang, Fujian (CN);
Shouqiang Hou, Fujian (CN);
Xiaoliang Wen, Fujian (CN); Yongzhe Dong, Fujian (CN)

(73) Assignee: XIAMEN LEEDARSON LIGHTING CO., LTD, Xiamen (CN)

( * ) Notice: Subject to any disclaimer, the term of this patent is extended or adjusted under 35 U.S.C. 154(b) by 0 days.

(21) Appl. No.: 16/953,045

(22) Filed: Nov. 19, 2020

(65) Prior Publication Data

US 2021/0148559 A1 May 20, 2021

(30) Foreign Application Priority Data

Nov. 19, 2019 (CN) .......................... 201922006051.6

(51) Int. Cl.
| | |
|---|---|
| *F21V 23/06* | (2006.01) |
| *F21V 23/04* | (2006.01) |
| *F21V 23/00* | (2015.01) |
| *F21V 8/00* | (2006.01) |
| *F21V 17/10* | (2006.01) |
| *F21S 9/02* | (2006.01) |
| *F21Y 115/10* | (2016.01) |

(52) U.S. Cl.
CPC ................ *F21V 23/06* (2013.01); *F21S 9/02* (2013.01); *F21V 17/105* (2013.01); *F21V 23/007* (2013.01); *F21V 23/04* (2013.01); *G02B 6/0043* (2013.01); *F21Y 2115/10* (2016.08)

(58) Field of Classification Search
CPC ........ F21V 15/01; F21V 21/14; F21V 23/006; F21V 23/008; F21S 10/005
See application file for complete search history.

(56) References Cited

U.S. PATENT DOCUMENTS

| | | | | |
|---|---|---|---|---|
| 4,992,914 | A * | 2/1991 | Heiss ..................... | E01C 17/00 |
| | | | | 362/153.1 |
| 8,231,259 | B2 * | 7/2012 | Keller ................... | F21V 7/0016 |
| | | | | 362/610 |
| 8,585,237 | B2 * | 11/2013 | Kim ..................... | G02B 6/0055 |
| | | | | 362/224 |
| 9,441,815 | B2 * | 9/2016 | Maxik ..................... | F21V 23/02 |
| 9,523,809 | B2 * | 12/2016 | Sakamoto ................ | F21K 9/61 |
| 9,534,771 | B2 * | 1/2017 | Wu ....................... | G02B 6/0081 |
| 10,466,411 | B2 * | 11/2019 | Conrad ................ | G02B 6/0078 |
| 10,609,782 | B2 * | 3/2020 | Zaderej ................ | H05B 47/19 |

(Continued)

*Primary Examiner* — Ismael Negron
(74) *Attorney, Agent, or Firm* — Chun-Ming Shih; Lanway IPR Services (57) ABSTRACT

A lighting apparatus includes a wiring box, a wiring board, multiple wires and a manual switch. The wiring box has a top cover and a bottom cover together forming a container space. The wiring board is disposed in the container space. Multiple wires are used. Each wire has a first end attached to the wiring board and a first detachable connector for respectively connecting to a second detachable connector of a light device. The manual switch is provided for a user to operate to control the light devices, and may be a button for turning on or turning off one or all light devices, or multiple buttons respectively for controlling different light devices.

19 Claims, 11 Drawing Sheets

(56) References Cited

U.S. PATENT DOCUMENTS

| | | | |
|---|---|---|---|
| 10,670,250 B2 * | 6/2020 | Bonne | F21V 23/02 |
| 2007/0165413 A1 * | 7/2007 | Sanner | F21V 23/00 |
| | | | 362/362 |
| 2011/0279039 A1 * | 11/2011 | Kishimoto | F21V 13/14 |
| | | | 315/113 |
| 2012/0236593 A1 * | 9/2012 | Wei | G02B 6/0085 |
| | | | 362/609 |
| 2016/0282539 A1 * | 9/2016 | Li | G02B 6/0038 |

* cited by examiner

APPARATUS WITH LIGHTING DEVICES AND WIRING BOX CONNECTED BY WIRES

FIELD

The present invention is related to a lighting apparatus, and more particularly related to a lighting apparatus with flexible configuration.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Some light devices are installed in a closet. Sometimes, such light devices need to be adjusted in their parameters or positions to fit different settings of a closet. It is important to provide a flexible and convenient design.

In addition to closet applications, people expect light devices used in other places also have more flexibility. Controlling is also important during such design.

Therefore, it is beneficial to provide a convenient design for different purposes.

SUMMARY

In some embodiments, a lighting apparatus includes a wiring box, a wiring board, multiple wires and a manual switch.

The wiring box has a top cover and a bottom cover together forming a container space.

The wiring board is disposed in the container space.

Multiple wires are used. Each wire has a first end attached to the wiring board and a first detachable connector for respectively connecting to a second detachable connector of a light device.

The manual switch is provided for a user to operate to control the light devices. For example, the manual switch may be a button for turning on or turning off one or all light devices. The manual switch may include multiple buttons respectively for controlling different light devices. In some embodiments, the manual switch may include a rotation switch or a touch pad for changing color temperatures, colors or intensities of the light devices.

In some embodiments, the second detachable connector is at a first end of a child wire.

A second end of the child wire is fixed on a housing of the light device.

In some embodiments, the wiring board is mounted with a driver for converting an external power to driving currents supplied to the light devices via the multiple wires.

In some embodiments, a battery is stored in the container space for supplying power to the light devices via the multiple wires.

In some embodiments, the light device has a light guide plate and a light source.

The light source emits a light into a lateral side of the light guide plate and the light is guided to escape the light guide plate from a front surface of the light guide plate disposed with multiple micro dots.

In some embodiments, the light device has a top cover and a bottom cover.

The light source includes multiple LED modules disposed on a band circuit board facing to the lateral side of the light guide plate.

In some embodiments, there is reflective layer disposed on the back cover and there is a light passing cover covering the light guide plate.

In some embodiments, magnetic units are disposed in the light devices to connect the light devices with a magnetic force of the magnetic units.

In some embodiments, a buckle unit is disposed to the light device to attach to another buckle unit of another light device.

In some embodiments, the light device has an input device for a user to send a command via the input device to operate the light device.

The command is also used for controlling at least one other light device.

In some embodiments, the light device has a sensor for collecting ambient data.

The ambient data are also used by controlling at least one other light device.

In some embodiments, the top cover has a light opening and a flip bar extended inwardly from a top surface of the top cover to engage the light passing plate.

The back cover includes a metal plate for heat dissipation.

In some embodiments, the light device has an extending port to attach more light devices.

In some embodiments, one light device of the light devices has a fixing unit to be fixed to a downlight cavity on a ceiling.

Said one light device has a structure connector for fix other light devices to said one light device.

In some embodiments, the wiring box is further connected to a wall switch.

An operation of the wall switch is integrated with a controller on the wiring board.

In some embodiments, the wiring box has a box connector for connecting to another wiring box of the same structure.

In some embodiments, a controller on the wiring board counts a total number of the attached light devices.

When the total number is over a predetermined threshold, a warning message is generated by the controller.

In some embodiments, each light device has an identifier for being controlled separately according to the identifier.

In some embodiments, a light device has an antenna shared by at least one other light device.

In some embodiments, the wiring box has a memory socket for inserting a memory device.

Users detach the memory device and insert the memory device to an external device to add a configuration file.

A controller on the wiring board reads the memory device and controls the light devices.

In some embodiments, the multiple light devices emit lights of different optical parameters.

The multiple light devices are controlled to render a mixed light of a required optical parameter.

DETAILED DESCRIPTION

In some embodiments, a lighting apparatus includes a wiring box 661, a wiring board 663, multiple wires 665, 666 and a manual switch 664.

Figure 3:
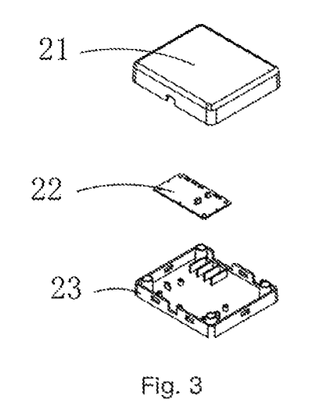
FIG. 3 illustrates an exploded view of a wiring box.

In FIG. 3, the wiring box has a top cover 21 and a bottom cover 23 together forming a container space 231. The wiring board 22 is disposed in the container space 231.

Multiple wires 665, 666 are used. Each wire has a first end 6621, 6622 attached to the wiring board 663 and a first detachable connector 667, 6611 for respectively connecting to a second detachable connector 6612, 667 of a light device 6614, 6615.

The manual switch 661 is provided for a user to operate to control the light devices 6614, 6615. For example, the manual switch 664 may be a button for turning on or turning off one or all light devices. The manual switch may include multiple buttons respectively for controlling different light devices. In some embodiments, the manual switch may include a rotation switch or a touch pad for changing color temperatures, colors or intensities of the light devices.

In some embodiments, the second detachable connector 6612, 667 is at a first end of a child wire 6613, 6610.

A second end 6623, 6624 of the child wire 6613, 6610 is fixed on a housing of the light device 6614, 6615.

In some embodiments, the wiring board 663 is mounted with a driver 6633 for converting an external power 662 to driving currents 6634 supplied to the light devices via the multiple wires. In some other embodiments, the external power, e.g. an 110V/220V alternating current power is routed to the light devices 6614, 6615, instead of being converted to direct current power first. Specifically, in such arrangement, the light devices 6614, 6615 have their own converters, e.g. rectifier circuit and filter circuit.

In some embodiments, the wiring board is designed as a routing box. In the routing box, some wires corresponding some light devices are grouped and wired together while other light devices are wired separately. Such grouping or routing may be made by actual wire routing or performed by adding some switch components, e.g. a module with conductive path configuration for routing electricity.

Figure 13:
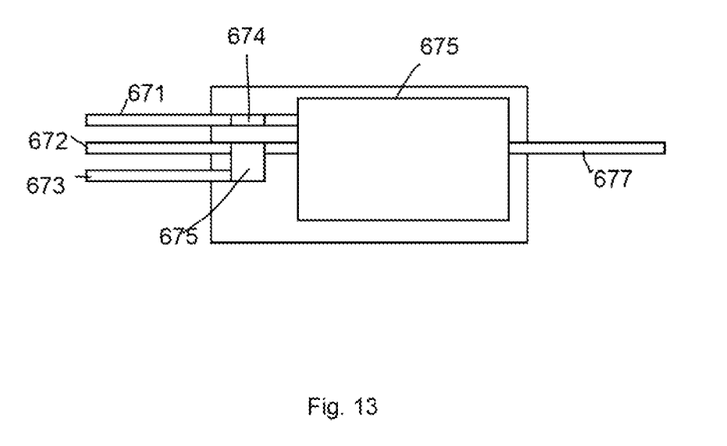
FIG. 13 illustrates a wiring example.

In FIG. 13, a wiring box contains a driver 675. Three wires 671, 672, 673 are connected to three light devices. Two switch components 674, 675 are used for grouping the wires 672, 673 together while the wire 671 is controlled separately.

Such configuration may also be made inside the driver 675. Specifically, some pins on the driver may be set corresponding to different setting. When micro-controllers are used, program codes may be used for dynamically changing the setting for determining how to control the light devices.

Figure 14:
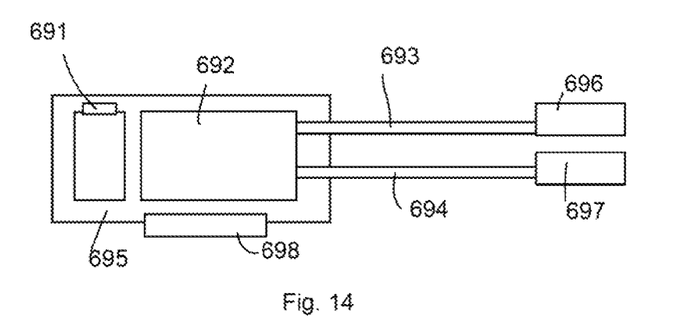
FIG. 14 illustrates adding a battery in a wiring box.

In FIG. 14, a battery 691 is stored in the container space 695 of a wiring box for supplying power to the light devices 696, 697 via the multiple wires 693, 694.

Figure 5:
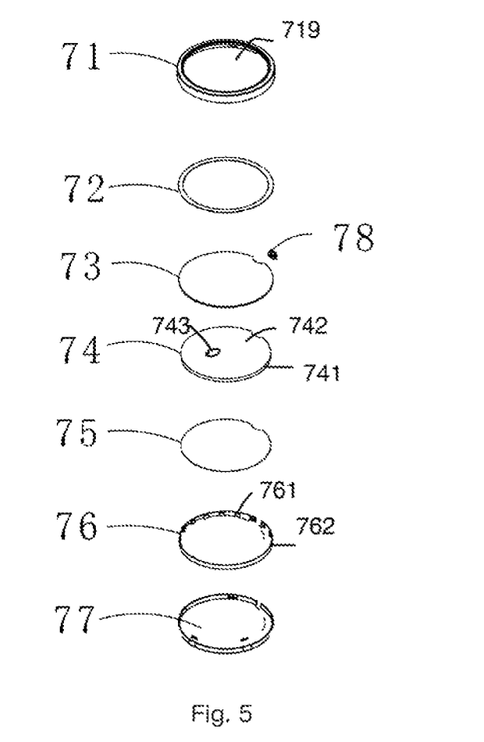
FIG. 5 illustrates an exploded view of a light device.

In FIG. 5, the light device has a light guide plate 74 and a light source 76. The light source includes multiple LED modules mounted on a belt circuit board.

The light source 76 emits a light into a lateral side 741 of the light guide plate 74 and the light is guided to escape the light guide plate from a front surface 742 of the light guide plate 74 disposed with multiple micro dots 743.

In FIG. 5, the light device has a top cover 71 and a bottom cover 77. The top cover has a ring defining a light opening in this example.

The light source 76 is placed on the back cover 77. The back cover 77 may be made of metal material so that heat of the light source 76 is carried away via the back cover 77 for heat dissipation.

There is a reflective layer 75, e.g. a white paper, for reflecting light to the light opening 719 of the top cover 71.

There is a second reflective paper made of a ring shape for reflecting light to the light opening 719, too. A light passing cover 73 is used for protecting the light guide plate 74.

There is a wire buckle 78 for fixing a wire, e.g. the child wire mentioned above, connecting to the wiring box.

The light source 76 includes multiple LED modules 761 disposed on a band circuit board 762 facing to the lateral side of the light guide plate 74.

In some embodiments, there is reflective layer disposed on the back cover and there is a light passing cover covering the light guide plate.

Figure 15:
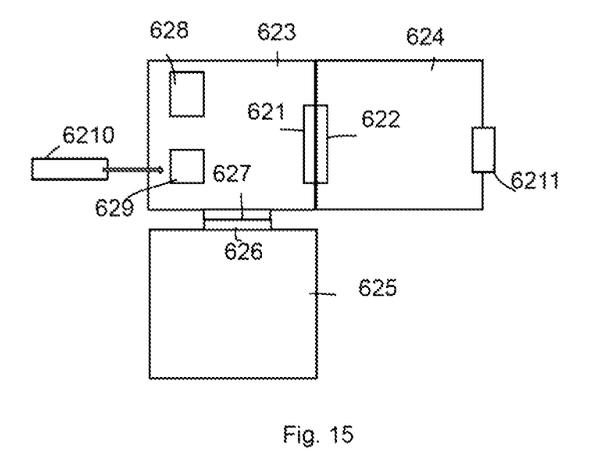
FIG. 15 illustrates integrating multiple light devices together.

In FIG. 15, magnetic units 621, 622 are disposed in the light devices 623, 624 to connect the light devices 623, 624 with a magnetic force of the magnetic units.

In FIG. 15, a buckle unit 627 is disposed to the light device 623 to attach to another buckle unit 628 of another light device 625.

In FIG. 15, the light device 623 has an input device 628 for a user to send a command via the input device 628 to operate the light device 623. For example, the input device 628 is a button, a touch panel, a rotator for receiving a manual operation as the command that is transmitted to circuit of the light device 623 to control the light source in the light device 623 according to the command, e.g. to turn on, to increase light intensity.

In some embodiments, the command is also used for controlling at least one other light device. For example, when users press the input device 628 on the light device 623, the command is translated to a control signal to the light device 624 to control the light device 624 at the same time.

The same command may be translated to multiple commands to a group of light devices. For example, users may touch one light device to turn on the touched light device and at the same time, the command is translated to turning off other light devices in some predetermined working modes.

Unlike traditional control designs, when one light device is controlled to behave with one mode, other light devices may be controlled differently even under one single command.

In FIG. 15, the light device has a sensor 629 for collecting ambient data 6210, e.g. ambient light intensity, motion of objects.

The ambient data are also used by controlling at least one other light device.

Figure 6:
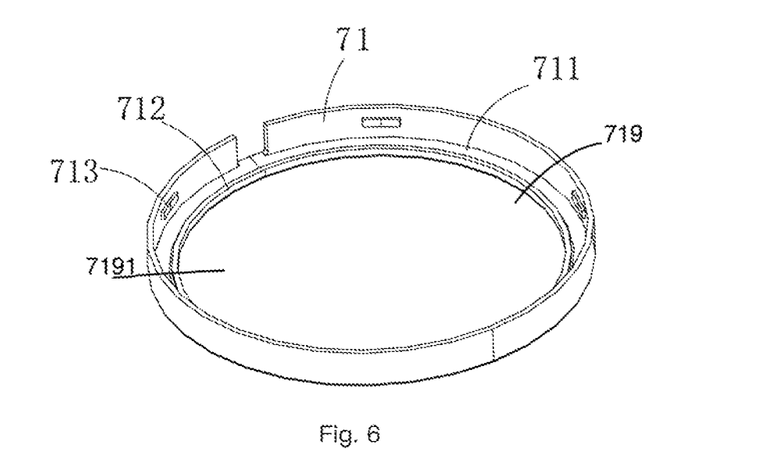
FIG. 6 illustrates a component of the light device in FIG. 5.

In FIG. 6, the top cover 71 has a light opening 719 and a flip bar 712 extended inwardly from a top surface 7191 of the top cover 71 to engage the light passing plate. There is a block ring 711 and protruding blocks 713 for fixing and aligning components.

The back cover includes a metal plate for heat dissipation.

In FIG. 14, the light device has an extending port 6211 to attach more light devices. For example, the extending port 6211 may be used for forwarding electricity and control signals to the connected light devices.

Figure 16:
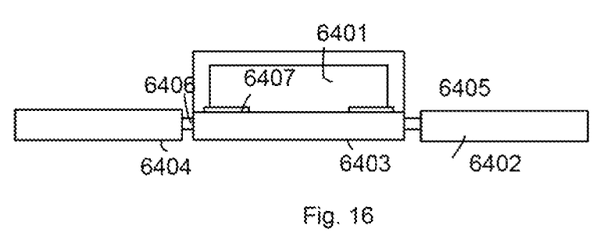
FIG. 16 illustrates using the concept to downlight design.

In FIG. 16, one light device 6403 of the light devices has a fixing unit 6407, e.g. torsion springs, to be fixed to a downlight cavity 6401 on a ceiling.

Said one light device 6503 has a structure connector 6406, 6405 for fix other light devices 6404, 6402 to said one light device 6403. In such arrangement, even there is only one cavity or junction box, multiple light modules may be installed easily. The wiring box may be placed inside the cavity 6401.

Figure 12:
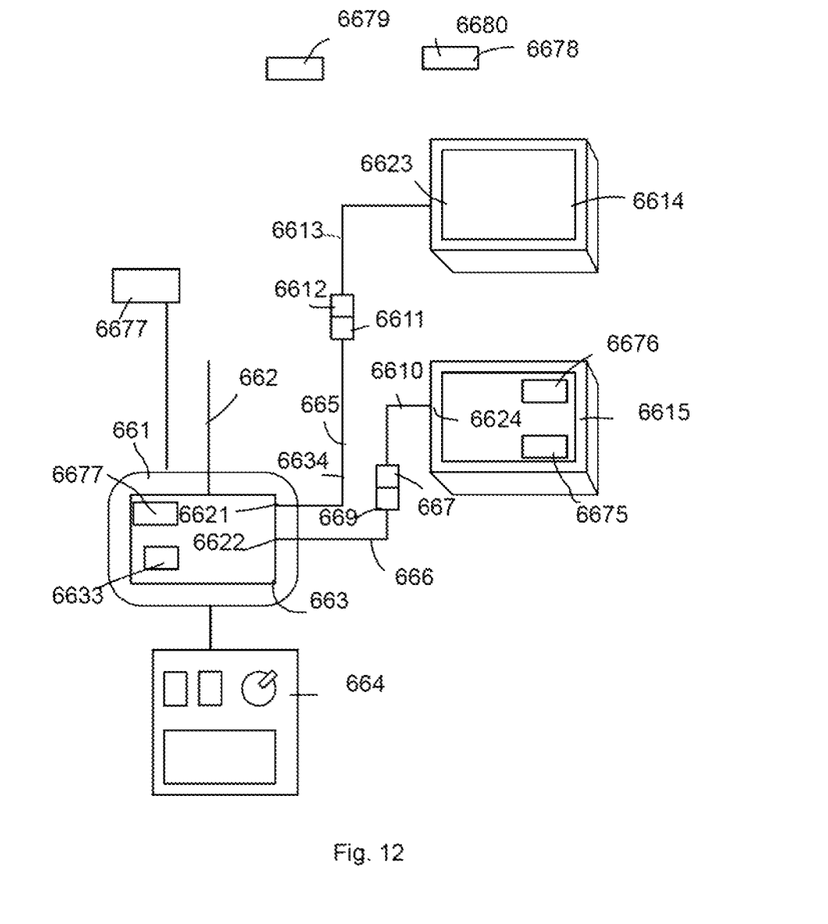
FIG. 12 illustrates another embodiment of a lighting apparatus.

In FIG. 12, the wiring box 661 is further connected to a wall switch 6677.

An operation of the wall switch 6677 is integrated with a controller 6633 on the wiring board 663.

In FIG. 14, the wiring box has a box connector 698 for connecting to another wiring box of the same structure.

In FIG. 12, a controller 6633 on the wiring board 663 counts a total number of the attached light devices.

When the total number is over a predetermined threshold, a warning message is generated by the controller, e.g. via an indicator. Meanwhile, the controller 6633 may stop operation of certain light devices to keep the system safe.

In FIG. 12, each light device has an identifier 6675 for being controlled separately according to the identifier.

In some embodiments, a light device has an antenna 6676 shared by at least one other light device.

In some embodiments, the wiring box has a memory socket 6677 for inserting a memory device 6678, e.g. a memory card, a USB thumb drive.

Users detach the memory device 6678 and insert the memory device 6678 to an external device 6679 to add a configuration file 6680.

A controller 6633 on the wiring board 6633 reads the memory device 6678 and controls the light devices 6614, 6615.

In some embodiments, the multiple light devices emit lights of different optical parameters.

The multiple light devices are controlled to render a mixed light of a required optical parameter.

Figure 1:
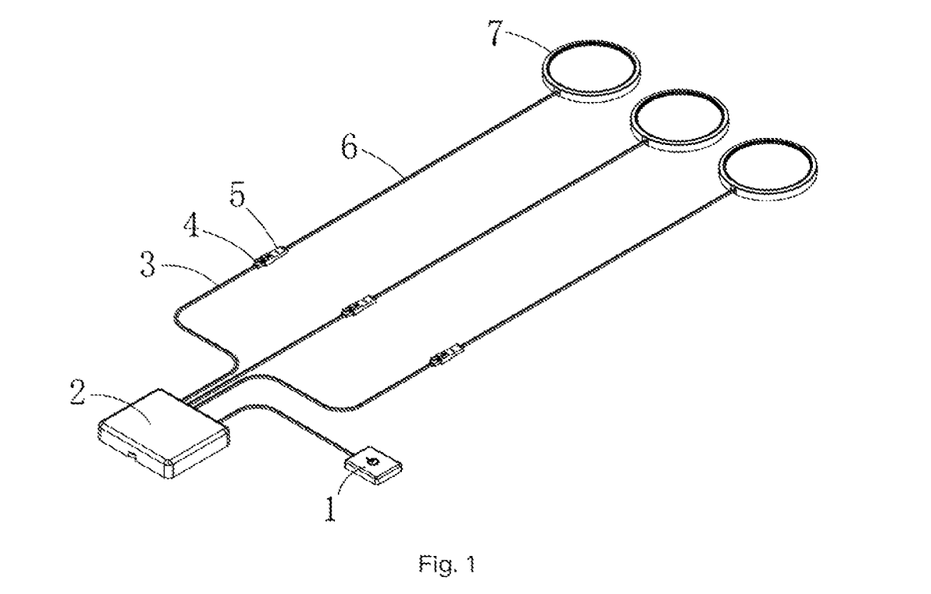
FIG. 1 illustrates an embodiment of a lighting apparatus.

FIG. 1 shows an embodiment. In FIG. 1, a wiring box is connected to three wires that have male plug terminal 3 as the first detachable connector connecting a second detachable connector 5, which is a female plug terminal connected to a child wire 6 that connects to a light device 7. There is a manual switch 1 for users to enter command. The manual switch 1 may be separated from the wiring box 2 or integrated with the wiring box 2.

Figure 2:
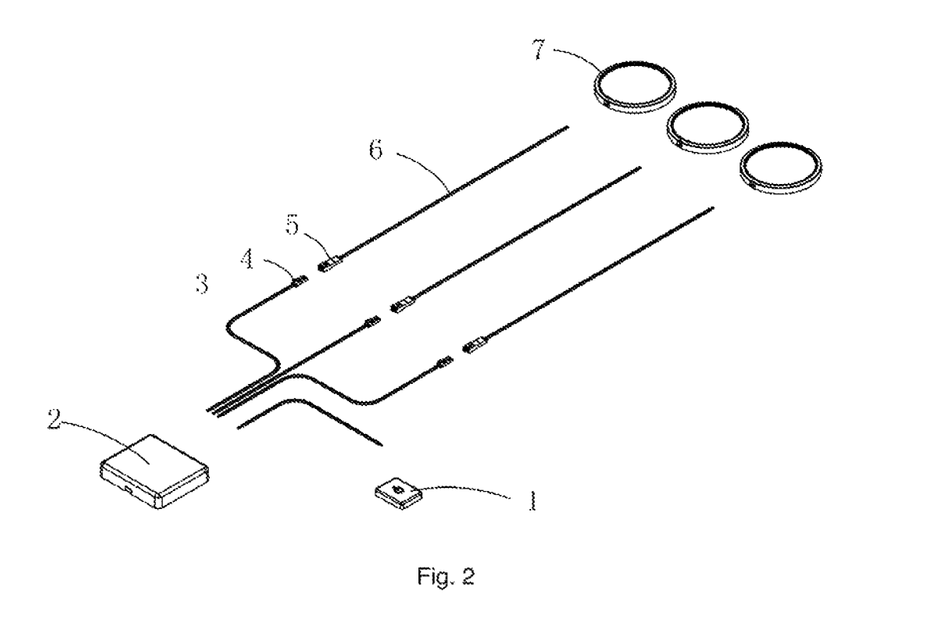
FIG. 2 illustrates a diagram showing components in an embodiment.

Please refer to FIG. 2, which illustrates the components in FIG. 1 are detached. The same reference numerals refer to the same components and are not repeated again.

Figure 4:
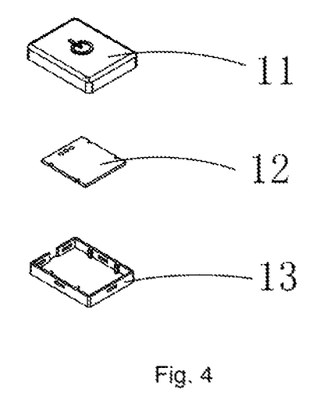
FIG. 4 illustrates an exploded view of a manual switch.

FIG. 4 shows a manual switch that has a top cover 11, a bottom cover 13 and a circuit board 12. the circuit board 12 may contain a circuit for translating a user operation to a command sent to a controller installed in the wiring box.

Figure 7:
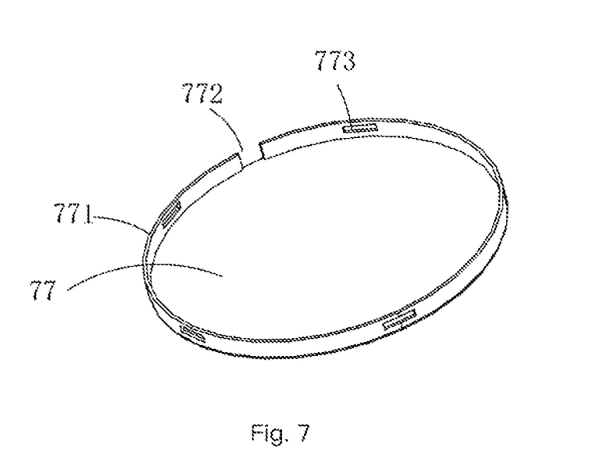
FIG. 7 illustrates a component of the light device in FIG. 5.

FIG. 7 shows a back cover 77 that has a heat dissipation ring 771 that engages the light source to carry heat away. There is an escape 772 for entering the wire. There is installation groove 773 for positioning fixing components.

Figure 8:
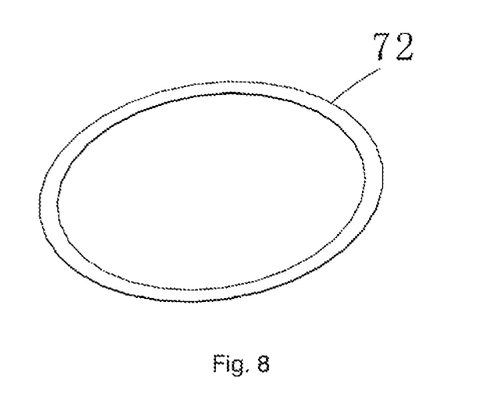
FIG. 8 illustrates a component of the light device in FIG. 5.

FIG. 8 show a second reflective layer 72 that is made as a ring shape to further reflect light more effectively toward the light opening.

Figure 9:
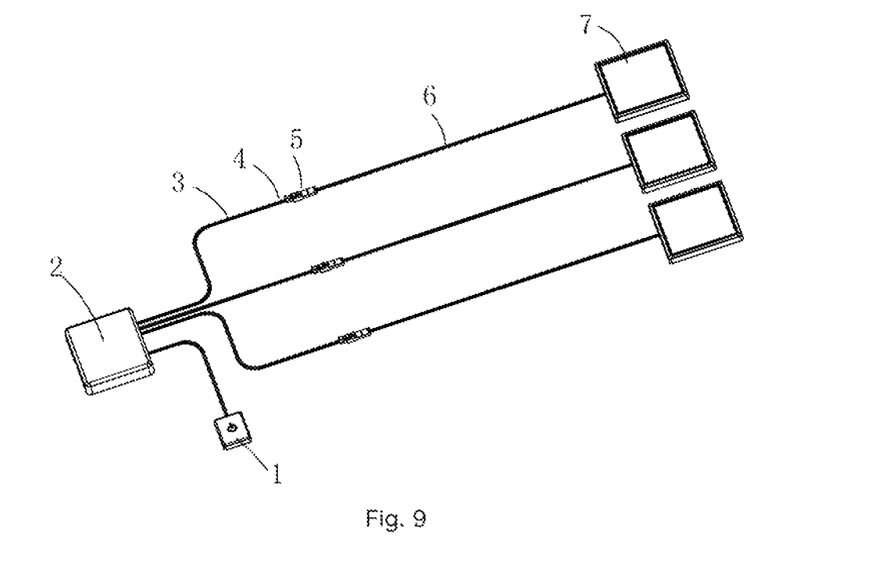
FIG. 9 illustrates another embodiment diagram.

FIG. 9 shows another embodiment, in which the light devices 7 have rectangular shapes instead of circular shapes. Other shapes are applicable in other embodiments.

Figure 10:
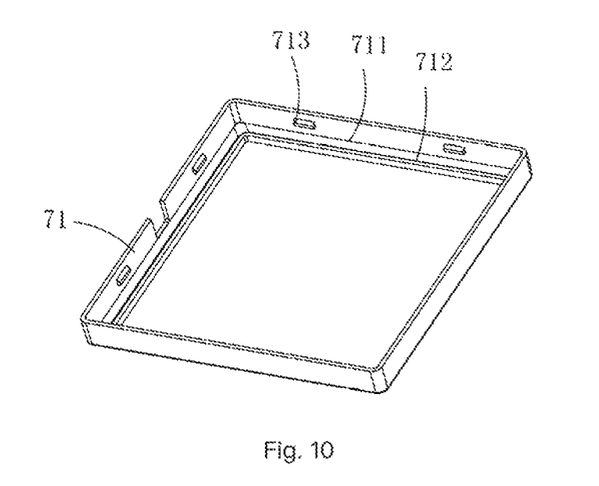
FIG. 10 illustrates another light device example.

FIG. 10 shows a rectangular component for a light device, similar to FIG. 6. The same reference numerals refer to similar components mentioned in FIG. 6.

Figure 11:
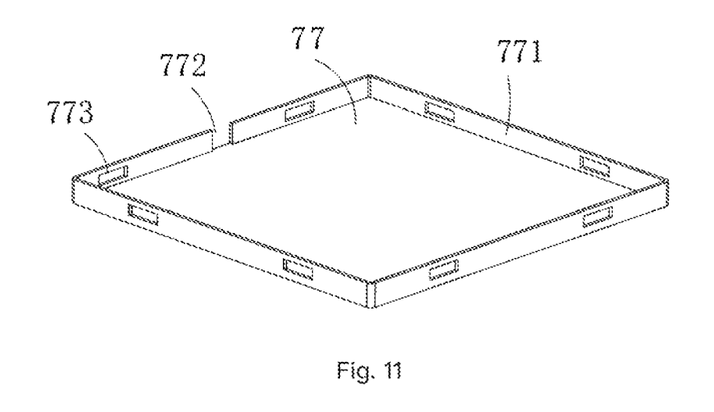
FIG. 11 illustrates a component in the example of FIG. 10.

FIG. 11 is a rectangular shape back cover similar to the example of FIG. 7. The same reference numerals refer to similar components mentioned in FIG. 7.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus comprising:
   a wiring box having a top cover and a bottom cover together forming a container space;
   a wiring board disposed in the container space;
   a plurality of wires, each wire having a first end attached to the wiring board and a second end with a first detachable connector;
   at least one lighting device having a second detachable connector connected to the first detachable connector; and
   a manual switch for a user to operate to control the light devices,
   wherein the wiring box further including a controller and a memory socket configured to receive a memory device, such that users input a configuration file for the controller to control the light devices.

2. The lighting apparatus of claim 1, wherein the second detachable connector is at a first end of a connecting wire, a second end of the connecting wire is fixed to a housing of the light device.

3. The lighting apparatus of claim 1, further comprising a driver for converting an external power to driving currents supplied to the light devices via the multiple wires, wherein the driver is mounted on the wiring board.

4. The lighting apparatus of claim 1, further comprising a battery is stored in the container space for supplying power to the light devices via the multiple wires, wherein the battery is stored in the container space.

5. The lighting apparatus of claim 1, one light device of the light devices further includes a fixing unit configured to be fixed to a downlight cavity on a ceiling, and a structure connector configured to fix other light devices to said at least one light device.

6. The lighting apparatus of claim 1, the wiring box further includes a controller connected to a wall switch, such that operation of the wall switch operates the controller.

7. The lighting apparatus of claim 1, wherein the at least one light device including a plurality of light devices configured to emit lights of different optical parameters, the multiple light devices controlled to provide a mixed light of a required optical parameter.

8. The lighting apparatus of claim 1, the wiring box further including a box connector configured for connecting to another wiring box of the lighting apparatus.

9. The lighting apparatus of claim 8, further comprising a controller provided on the wiring board, the controller configured to count a total number of light devices attached to the wiring board and, when the total number is over a predetermined threshold, generate a warning message.

10. The lighting apparatus of claim 8, wherein each light device has an identifier, wherein the identifier enables each light device to be controlled separately.

11. The lighting apparatus of claim 8, at least one of the light devices further including an antenna shared by at least one other light device.

12. The lighting apparatus of claim 1, the light device further including a light guide plate having a front surface, multiple micro dots and a lateral side, and a light source configured to emit light into the lateral side of the light guide plate, such that the light is guided to escape the light guide plate from the front surface of the light guide plate by the micro dots.

13. The lighting apparatus of claim 12, the light device further including an extending port configured to attach other light devices.

14. The lighting apparatus of claim 12, wherein the light device further including a top cover and a bottom cover, the light source includes multiple LED modules disposed on a band circuit board facing the lateral side of the light guide plate.

15. The lighting apparatus of claim 14, the light devices further include magnetic units configured to connect the light devices to one another.

16. The lighting apparatus of claim 14, further including a buckle unit to provided in the light device, the buckle unit configured to attach to the buckle unit of another light device.

17. The lighting apparatus of claim 14, the top cover including a light opening and a flip bar extended inwardly from a top surface of the top cover to engage the light guiding plate, the back cover comprises a metal plate for heat dissipation.

18. The lighting apparatus of claim 14, the light device further including as an input device for a user to send a command via the input device to operate the light device, the command is also used for controlling at least one other light device.

19. The lighting apparatus of claim 18, the light device further including a sensor for collecting ambient data, the ambient data are also used by controlling at least one other light device.

* * * * *